United States Patent [19]

Boyer et al.

[11] Patent Number: 4,772,901

[45] Date of Patent: Sep. 20, 1988

[54] ELECTROSTATIC PRINTING UTILIZING DEHUMIDIFIED AIR

[75] Inventors: Alan H. Boyer, East Sullivan; Graham D. Walter, Peterborough; Robert A. Moore, Amherst, all of N.H.

[73] Assignee: Markem Corporation, Keene, N.H.

[21] Appl. No.: 78,027

[22] Filed: Jul. 28, 1987

Related U.S. Application Data

[63] Continuation of Ser. No. 890,303, Jul. 29, 1986, abandoned.

[51] Int. Cl.[4] .................. G01D 15/00

[52] U.S. Cl. .................. 346/159; 346/153.1

[58] Field of Search .................. 346/153.1, 155, 159, 346/145, 1.1; 355/30, 3 CH, ; 34/46, 50; 219/216; 101/DIG. 13; 400/119; 358/300; 250/423 R, 423 P, 423 F; 165/14, 16, 21, 30, 3

[56] References Cited

U.S. PATENT DOCUMENTS

| | | | |
|---|---|---|---|
| 2,225,247 | 12/1940 | Kline et al. | 346/159 |
| 2,868,989 | 1/1959 | Haacke | 346/159 |
| 2,885,556 | 5/1959 | Gundlach | 346/159 |
| 2,931,688 | 4/1960 | Innes et al. | 346/159 |
| 3,023,070 | 2/1962 | Benn | 346/159 |
| 3,195,142 | 7/1965 | Benn et al. | 346/159 |
| 3,213,461 | 10/1965 | Goddard | 346/159 |
| 3,324,291 | 6/1967 | Hudson | 346/159 |
| 3,382,360 | 5/1968 | Young et al. | 346/159 |
| 3,495,269 | 2/1970 | Mutschler et al. | 346/159 |
| 3,496,352 | 2/1970 | Jugle | 346/159 |
| 3,545,374 | 12/1970 | Hendricks, Jr. | 346/159 |
| 3,606,531 | 9/1971 | Gourdine | 346/159 |
| 3,646,351 | 2/1972 | Jarvis | 346/159 |
| 3,665,181 | 5/1972 | Cobb | 346/159 |
| 3,689,935 | 9/1972 | Pressman et al. | 346/159 |
| 3,715,762 | 2/1973 | Magill et al. | 346/159 |
| 3,725,951 | 4/1973 | McCurry | 346/159 |
| 3,742,516 | 6/1973 | Cavanaugh et al. | 346/159 |
| 3,779,166 | 12/1973 | Pressman et al. | 346/159 |
| 3,862,420 | 1/1975 | Banks et al. | 346/159 |
| 3,878,469 | 4/1975 | Bolasny | 346/159 |
| 3,978,492 | 8/1976 | Simm | 346/159 |
| 3,979,759 | 9/1976 | Simm | 346/159 |
| 4,016,813 | 4/1977 | Pressman et al. | 346/159 |
| 4,030,106 | 6/1977 | Bestenreiner et al. | 346/159 |
| 4,040,731 | 8/1977 | Nishikawa | 346/159 |
| 4,050,377 | 9/1977 | Watanabe et al. | 346/159 |
| 4,057,723 | 11/1977 | Sarid et al. | 346/159 |
| 4,105,444 | 8/1978 | Shinohara et al. | 346/159 |
| 4,110,614 | 8/1978 | Sarid et al. | 346/159 |
| 4,117,778 | 10/1978 | Watanabe et al. | 346/159 |
| 4,124,854 | 11/1978 | Kirtikar | 346/159 |
| 4,152,747 | 5/1979 | Fisher | 346/159 |
| 4,160,257 | 7/1979 | Carrish | 346/159 |
| 4,338,614 | 7/1982 | Pressman et al. | 346/159 |
| 4,353,970 | 10/1982 | Dryczynski et al. | 346/159 |
| 4,357,618 | 11/1982 | Ragland | 346/159 |
| 4,365,549 | 12/1984 | Fotland et al. | 346/159 |
| 4,408,214 | 10/1983 | Fotland et al. | 346/159 |
| 4,409,604 | 10/1987 | Fotland | 346/159 |
| 4,446,371 | 5/1984 | Cobb | 346/159 |
| 4,463,363 | 7/1984 | Gundlach et al. | 346/159 |
| 4,563,081 | 1/1986 | Sato | 355/14 CH |
| 4,591,885 | 5/1986 | Day et al. | 346/159 |
| 4,619,515 | 10/1986 | Maczuszenko et al. | 346/159 |

FOREIGN PATENT DOCUMENTS

| | | | |
|---|---|---|---|
| 53-125839 | 11/1978 | Japan | 346/159 |
| 53-136830 | 11/1978 | Japan | 346/159 |
| 59-204055 | 11/1984 | Japan | 346/159 |
| 1309449 | 3/1973 | United Kingdom | 346/159 |
| 1309664 | 3/1973 | United Kingdom | 346/159 |

OTHER PUBLICATIONS

R. E. McCurry, "Direct Ionic Printer-Plotter", IBM Technical *Disclosure Bulletin,* vol. 15, No. 1, p. 275 (Jun. 1972).

(List continued on next page.)

*Primary Examiner*—A. Evans

*Attorney, Agent, or Firm*—Robbins & Laramie

[57] ABSTRACT

An offset electrostatic printer is disclosed which comprises (a) an ion modulated electrostatic print head for forming latent electrostatic images, (b) a dielectric imaging member comprising a layer of dielectric material, (c) means for developing a latent electrostatic image on the dielectric imaging member, (d) means for transferring a developed electrostatic image from the dielectic imaging member to an image receiving surface, (e) means for supplying unheated dehumidified air having a relative humidity of less than about 20 percent at or near ambient temperature, and (f) means for directing the dehumidified air at, near or through the print head and at or near the dielectric imaging member.

14 Claims, 8 Drawing Sheets

OTHER PUBLICATIONS

H. B. Dean, "Corona Apparatus", *IBM Technical Disclosure Bulletin,* vol. 17, No. 9, p. 2745 (Feb. 1975).

G. L. Harpavat et al., "Arrangement for Preventing Dirt Accumulation on Corona Discharge Devices", *Xerox Disclosure Journal,* vol. 1, No. 3, p. 57 (Mar. 1976).

J. W. Laing, "The Ion Chemistry of Corona Discharges in Air", Annual Reprographic Conference on Electrical Insulation and Dielectric Phenomena, Oct. 21-24, 1979.

W. J. Bernardelli et al., "Corona Contamination Reduction", *IBM Technical Disclosure Bulletin,* vol. 23, No. 9, pp. 4037-4038 (Feb. 1981).

J. M. Adley et al., "Corona Design with Ozone Ducts", *IBM Technical Disclosure Bulletin,* vol. 26, No. 3A, p. 1024 (Aug. 1983).

R. R. Thettu et al., "Corona Device with Reduced Ozone Emission", *Xerox Disclosure Journal,* vol. 1, No. 3, p. 59 (Mar. 1976).

T. J. Hammond et al., "Corona Device", *Xerox Disclosure Journal,* vol. 1, No. 3, p. 61 (Mar. 1976).

C. D. Wilson, "Air Conditioning of Xerographic Reproduction Machines", *Xerox Disclosure Journal,* vol. 1, No. 7, p. 69 (Jul. 1976).

*Patent Abstracts of Japan,* vol. 8, No. 157, P-288, 1594 (Jul. 20, 1984).

R. J. Chadwell et al., "Control of Photoconductor Environment", *IBM Technical Disclosure Bulletin,* vol. 19, No. 2, p. 392 (Jul. 1976).

Patent Abstracts of Japan, vol. 9, No. 243, P-392, 1966 (Sep. 30, 1985).

Patent Abstracts of Japan, vol. 8, No. 163, P-290, 1600 (Jul. 27, 1984).

*Patent Abstracts of Japan,* vol. 10, No. 26, P-425, 2083 (Jan. 31, 1986).

ELECTROSTATIC PRINTING UTILIZING DEHUMIDIFIED AIR

This application is a continuation of application Ser. No. 890,303, filed July 29, 1986, now abandoned.

BACKGROUND OF THE INVENTION

1. Field of the Invention

The present invention relates generally to an offset electrostatic printer which utilizes dehumidified air to extend the lifetimes of the print head and of the dielectric imaging member and to an offset electrostatic imaging process involving the utilization of dehumidified air.

2. Description of the Prior Art

In a typical electrostatic imaging process, a latent electrostatic image is formed on a dielectric charge retentive surface using a non-optical means, such as an electrostatic print head which generates ions by the corona discharge from a small diameter wire or point source. The dielectric surface can be either on the final image recording or receiving medium or on an intermediate transfer element, such as a cylindrical drum.

The latent electrostatic image is then developed by depositing a developer material containing oppositely charged toner particles. The toner particles are attracted to the oppositely charged latent electrostatic image on the dielectric surface. If the dielectric surface is on the final recording medium, then the developed image can be fixed by applying heat and/or pressure. If the dielectric surface is on an intermediate transfer element, however, then the developed image must first be transferred to the final recording medium, for example plain paper, and then fixed by the application of heat and/or pressure. Alternatively, the developed image may be fixed to the final recording medium by means of the high pressure applied between the dielectric-coated transfer element and a pressure roller, between which the final recording medium passes.

The intermediate transfer element in an offset electrostatic imaging process is typically a cylindrical drum made from an electrically conductive, non-magnetic material, such as aluminum or stainless steel, which is coated with a dielectric material. Suitable dielectric materials include polymers, such as polyesters, polyamides, and other insulating polymers, glass enamel, and aluminum oxide, particularly anodized aluminum oxide. Dielectric materials such as aluminum oxide are preferred to layers of polymers because they are much harder, and therefore, are not as readily abraded by the developer materials and the high pressure being applied. Metal oxide layers prepared by a plasma spraying or detonation gun deposition process have been particularly preferred as dielectric layers because they are harder and exhibit longer lifetimes than layers prepared using other processes.

One major problem encountered with currently available electrostatic printers of the ion deposition screen type has been the limited lifetime of the electrostatic aperture board. These types of electrostatic printers are disclosed in U.S. Pat. Nos. 3,689,935, 4,338,614 and 4,160,257. Such electrostatic printers have a row of apertures which selectively allow ionized air to be deposited onto a dielectric surface in an imagewise dot matrix pattern. It has been observed that a chemical debris tends to build up around the apertures and on the corona wire as a function of time and the humidity of the air. This chemical debris was found to be a crystalline form of ammonium nitrate. This particular chemical is created when air containing water molecules, such as is generally encountered, is ionized.

It has also been observed that, when an electrostatic printer of the type disclosed in U.S. Pat. No. 4,365,549 is operated in a moderately high relatively humidity, the surface conductivity of the dielectric drum increases where the ionized water molecules are deposited. The ionized water molecules are complexes containing hydronium ions. Water molecules in the air can become ionized by the corona wire in the ion deposition print head or by the A.C. scorotrons which are used to discharge residual charge on the drum. These conductive areas are observed on the final recording medium as weakly developed areas. This is believed to be caused by the more conductive surfaces leaking off their latent electrostatic images to the toner which has been made conductive during the development operation.

A number of methods have been suggested for alleviation of this problem of contaminant buildup. It has been suggested that the air being supplied to the corona discharge device first be filtered through a filter for ammonia in order to prevent the formation of ammonium nitrate. This method has not been found to be effective because it does not remove the water molecules in the air which under the influence of a corona discharge and in combination with other components of air form precursors to ammonium nitrate. Another method suggested for inhibiting formation of ammonium nitrate in an ion generator which includes a glow discharge device is to heat the glow discharge device above its intrinsic operating temperature at or near the ion generation sites.

SUMMARY OF THE INVENTION

In accordance with the present invention, the operational lifetime of an offset electrostatic printer can be prolonged by an order of magnitude by passing unheated dehumidified air at, near or through the ion modulated print head of the printer and at or near the surface of the dielectric imaging member.

An electrostatic printer in accordance with the present invention comprises an ion modulated electrostatic print head for forming latent electrostatic images, a dielectric imaging member comprising a layer of dielectric material, means for developing a latent electrostatic image on the dielectric imaging member, means for transferring a developed electrostatic image from the dielectric imaging member to an image, means for supplying unheated dehumidified air at or near ambient temperature having a relative humidity of less than about 20 percent, and means for directing the dehumidified air at, near or through the print head and at or near the dielectric imaging member. In a preferred embodiment, the print head comprises a modulated aperture board having a plurality of selectively controlled apertures therein and an ion generator for projecting ions through the apertures. In this embodiment, the dehumidified air is directed at or near the ion generaor and at, near or through the apertures. The offset electrostatic printer may further comprise an ion generator for erasing latent electrostatic images, and a means for directing dehumidified air at or near such ion generator.

The process of the present invention comprises the steps of forming a latent electrostatic image on a dielectric imaging member using an electrostatic print head, developing the latent electrostatic image, transferring the developed electrostatic image from the dielectric imaging member to an image receiving surface, providing unheated dehumidified air, and directing it at, near or through the print head and at or near the dielectric imaging member. The process may further comprise the steps of erasing the latent electrostatic images by means of an ion generator and directing the dehumidified air at or near such ion generator.

When unheated dehumidified air having a relative humidity of less than about 20 percent, and preferably, less than about 5 percent, is used, the lifetime of the offset electrostatic printer can be extended significantly. It has been found that the use of such dehumidified air substantially inhibits the formation of ammonium nitrate around the ion generators, the apertures and the dielectric imaging member, by removing the water molecules in the air which in combination with other components of air and under the influence of a corona discharge form precursors to ammonium nitrate, such as nitric acid and ammonia. The use of unheated dehumidified air also reduces oxidation of the electrodes used to control the apertures, and provides for more uniform deposition of ions across the print head. In addition, the use of unheated dehumidified air improves the retention of the latent electrostatic images on the dielectric imaging member.

BRIEF DESCRIPTION OF THE DRAWINGS

The various objects, advantages and novel features of the invention will be fully appreciated from the following detailed description when read in conjunction with the apprended drawings, in which.

Throughout the drawings, like reference numerals will be used to identify like parts.

DETAILED DESCRIPTION OF THE PREFERRED EMBODIMENTS

Figure 1:
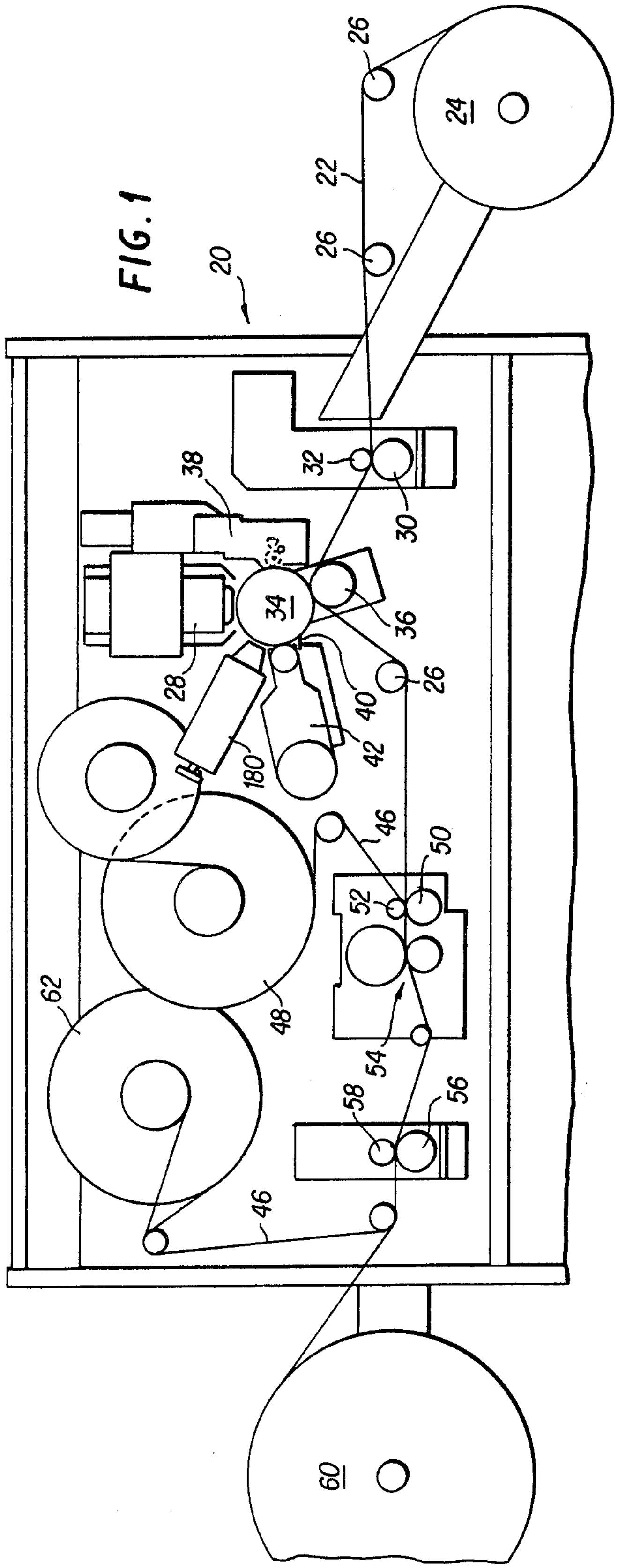
FIG. 1 illustrates an offset electrostatic printing system in which the present invention may be employed.
Figure 5:
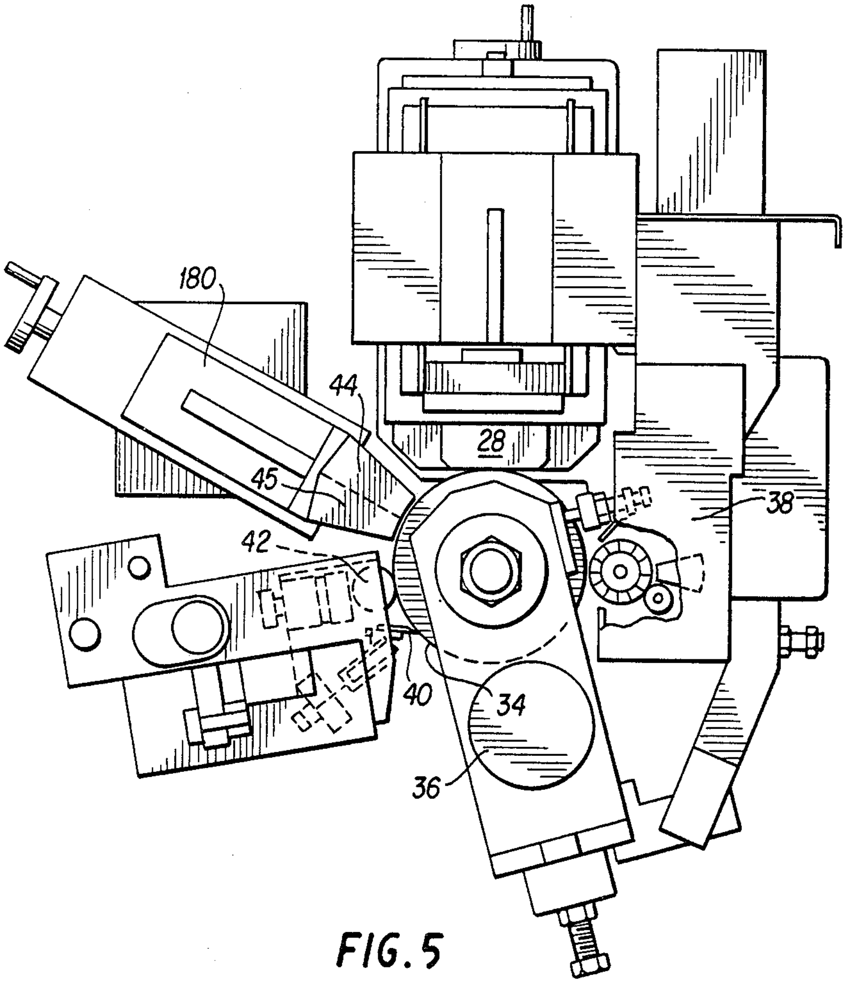
FIG. 5 is an enlarged view of the area around the dielectric drum of the offset electrostatic printing system illustrated in FIG. 1.

FIG. 1 illustrates an offset electrostatic label printing system 20 which may advantageously be used to practice the process of the present invention. A web 22 of plain paper is fed from a supply reel 24 and is carried by a number of guide wheels 26 through a brake roll nip formed by rolls 30 and 32 and then between dielectric drum 34 and backup roll 36. A latent electrostatic image is formed on dielectric drum 34 which has been prepared by coating a conductive substrate with a metal oxide layer using a plasma spraying or detonation gun deposition process. The latent electrostatic image is formed by means of an ion modulated electrostatic print head 28 as the drum 34 rotates. The latent image is developed on the drum 34 by the developer unit 38, and the developed image is then transferred to the paper web 22 and simultaneously pressure-fixed thereon at the nip between the drum 34 and the backup roll 36. A doctor blade 40 is provided to scrape off the developer material residue followed by cleaning of the dielectric layer with web cleaner 42. Any latent electrostatic images remaining on the drum are then erased by corona neutralizer unit 180 in preparation for subsequent printing cycles. An enlarged view of the area around dielectric drum 34 is shown in FIG. 5.

A web 46 of overlaminate material is fed from supply reel 48 through a nip formed by rolls 50 and 52 where it is applied over the printed image on web 22. The overlaminated printed web is then cut into finished labels by rotary die cutting station 54 and passed through a drive roll nip formed by rolls 56 and 58. The finished labels are wound onto rewind reel 60 and the cutout overlaminate web 46 is wound onto waste rewind reel 62.

Figure 4:
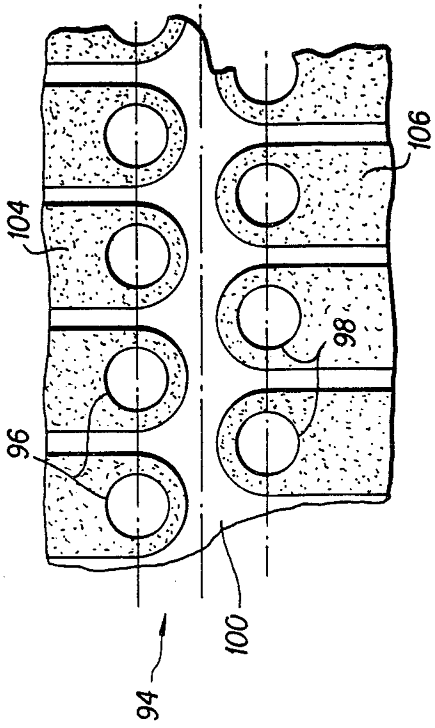
FIG. 4 is a still further enlarged view of the aperture electrodes carried by the aperture mask.
Figure 2:
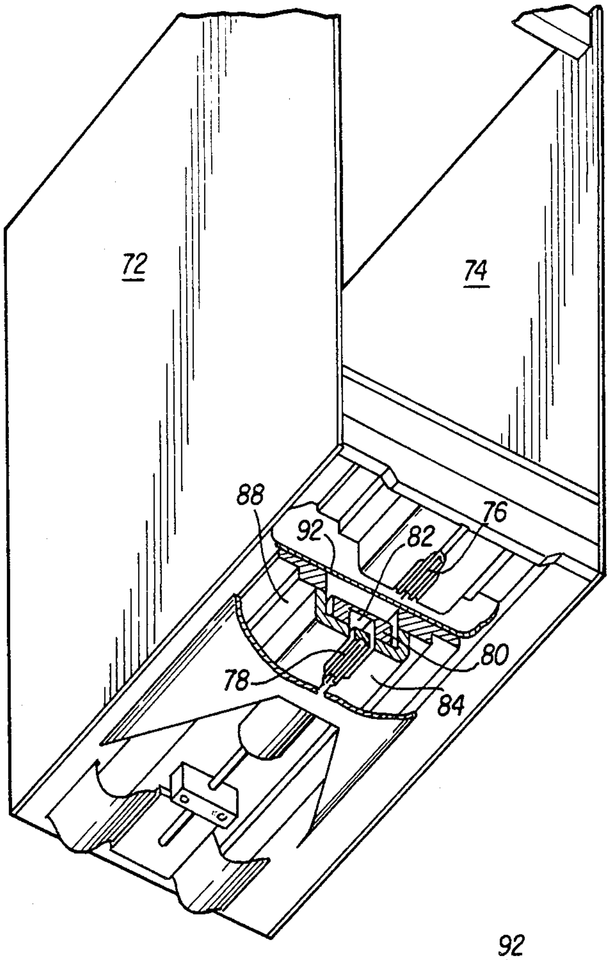
FIG. 2 is a perspective view of the electrostatic print head, with portions cut away to illustrate certain internal details.
Figure 3:
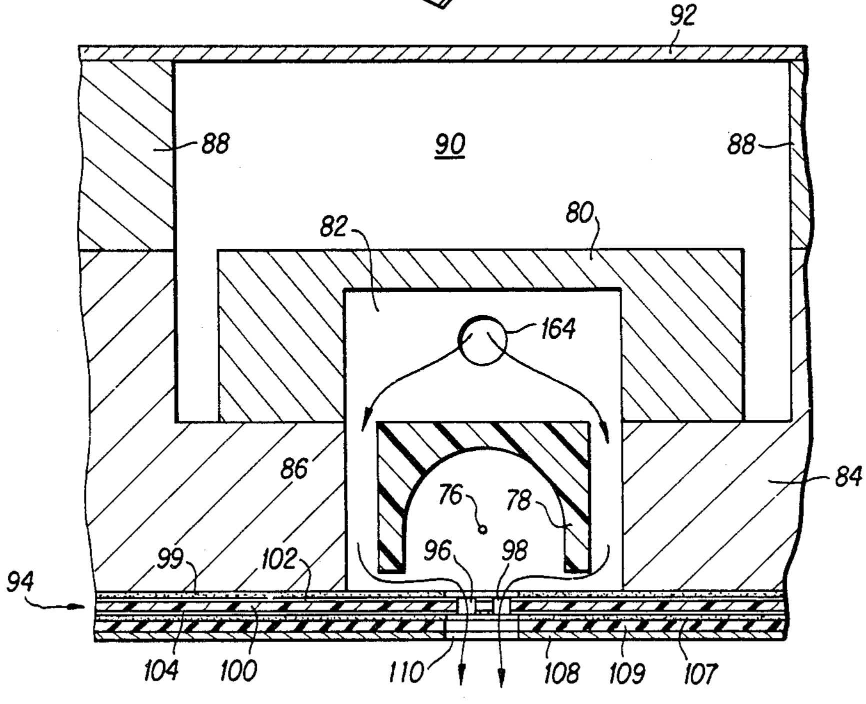
FIG. 3 is an enlarged sectional view of the corona wire and aperture mask assembly of the print head.

FIG. 2 is a perspective view of the electrostatic print head 28 with portions cut away to illustrate certain internal details. FIG. 3 is an enlarged sectional view of the corona wire and aperture mask assembly of the print head, and FIG. 4 is a still further enlarged view of the aperture electrodes carried by the aperture mask. The print head 28 is of the type disclosed and claimed in U.S. Pat. No. 3,689,935, issued to Gerald L. Pressman et al. on Sept. 5, 1972 and U.S. Pat. No. 4,016,813, issued to Gerald L. Pressman et al. on Apr. 12, 1977, both of these patents being expressly incorporated herein by reference. The print head 28 also embodies certain improvements disclosed and claimed in U.S. Pat. No. 4,338,614, issued to Gerald L. Pressman et al. on July 6, 1982 and also incorporated herein by reference.

The print head 28 of FIG. 2 generally comprises a pair of electrical circuit boards 72, 74 mounted on either side of a centrally-located corona wire and aperture mask assembly. The corona wire 76 is enclosed within an elongated conductive corona shield 78 which has a U-shaped cross-section. The corona shield 78 is supported at each of its two ends by a manifold block 80 that is formed with an oblong central cavity 82. The manifold block 80 is nested within a mask support block 84 which is generally C-shaped in cross-section. The mask support block 84 is formed with an oblong central opening 86 which registers with the cavity 82 in the manifold block 80 and receives the corona shield 78. The mask support block 84 is secured at its edges to a print head slider 88, the latter being the primary supporting structure of the print head 28 and carrying the two circuit boards 72, 74. The print head slider 88 is formed with a large central cut-out 90 and is secured to driver board 92.

The corona shield 78 is positioned in facing relationship with an aperture mask formed by a flexible circuit board 94. Referring particularly to FIGS. 3 and 4, the circuit board 94 is formed with two staggered rows of apertures 96, 98 extending parallel to the corona wire 76 and transverse to the direction of movement of the web 22 in FIG. 1. Positive ions produced by the corona wire 76, which is maintained at a positive DC potential of about 2.7 kilovolts, are induced to pass through the apertures 96, 98 under the influence of an accelerating potential which is maintained between the corona wire 76 and the conductive core of the drum 34 of FIG. 1. The flexible circuit board 94 includes a central insulating layer 100 and carries a continuous conductive layer 102 on the side facing the corona wire 76. The opposite side of the insulating layer 102 carries a number of conductive segments 104, 106 associated with the individual apertures 96, 98 as shown in FIG. 4. Circuit board 94 is secured to mask support block 84 by a thin layer of adhesive 99 and to slotted focus plane 108 by an insulating adhesive layer 109. Circuit board 94 is overlaminated with a thin insulating layer 107. In operation, individual potentials are applied between the conductive segments 104, 106 and the continuous conductive layer 102 in order to establish local fringing fields within the apertures 96, 98. As described in the aforementioned U.S. Pat. Nos. 3,689,935 and 4,016,813, these fringing fields can be used to block or permit the flow of ions from the corona wire 76 to the drum 34 of FIG. 1 through selected ones of the apertures 96, 98. The apertures are controlled by appropriate electronics carried by the circuit boards 72, 74. As explained in the aforementioned U.S. Pat. No. 4,338,614, the performance of the print head may be enhanced by interposing a slotted focus plane made of a conductive material between the modulated apertures 96, 98 and the dielectric-coated drum 34. The slotted focus plane is illustrated at 108 in FIG. 3, with the slot 110 aligned with the aperture rows 96, 98.

In an alternative embodiment, the corona wire 76 may consist of a dielectric-coated conductor using a high-frequency AC voltage source. Ion generators of this type generate both positive and negative ions, although only one type of ion (in this case positive) is drawn through the apertures 96, 98 by the DC accelerating potential existing between the corona wire and the drum 34. Dielectric-coated AC corona devices are described in U.S. Pat. No. 4,057,723, issued to Dror Sarid et al. on Nov. 8, 1977; U.S. Pat. No. 4,110,614, issued to Dror Sarid et al. on Aug. 29, 1978; U.S. Pat. No. 4,409,604, issued to Richard A. Fotland on Oct. 11, 1983; and U.S. Pat. No. 4,446,371, issued to Harold W. Cobb on May 1, 1984. The foregoing patents are expressly incorporated by reference herein.

In practice, it has been found that deposits of ammonium nitrate form in and around the apertures 96, 98, principally on the side facing the corona wire 76. Some deposits also form on the corona wire itself, thereby reducing its output and producing a nonuniform corona. After the print head has been in operation with an air flow which has not been dehumidified for about 50–75 hours, the deposits of ammonium nitrate in and around the apertures 96, 98 begin to restrict the flow of ions through the apertures. The effect on output can be counteracted somewhat by increasing the potential on the corona wire 76, but eventually a point is reached at which the apertures become substantially completely blocked. When this occurs, the print head 28 must be removed from the printing apparatus and the flexible circuit board 94 carrying the apertures 96, 98 must be replaced or cleaned. The flexible circuit board 94 is rather difficult and expensive to manufacture, since it must be etched with a pattern of fine, closely-spaced conductors for controlling the individual apertures. Therefore, frequent replacement of this component is undesirable. Frequent cleaning is also undesirable because there is the possibility of damaging the delicate circuit and because it is time consuming.

Figure 6:
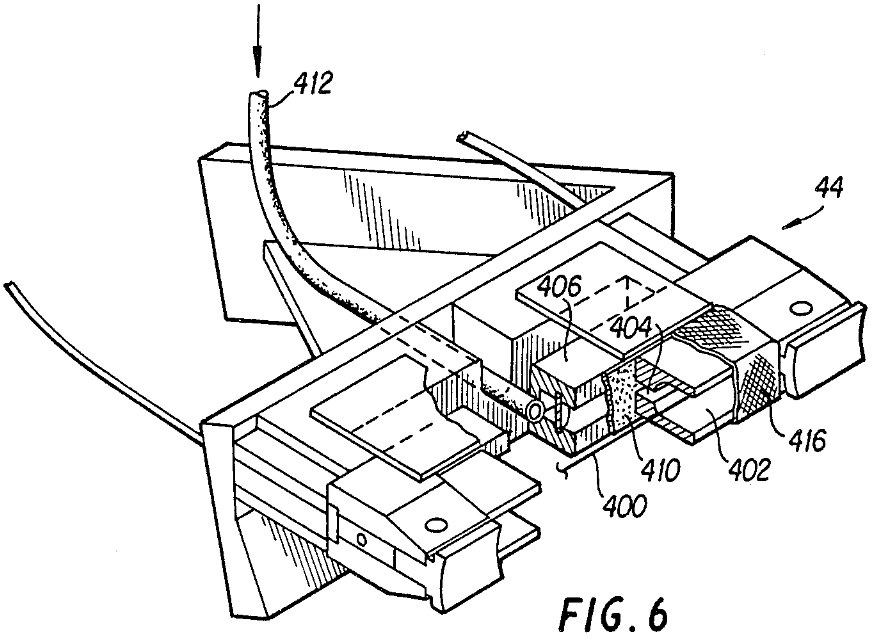
FIG. 6 is a perspective view of a corona neutralizer, with portions cut away to illustrate certain internal details.
Figure 7:
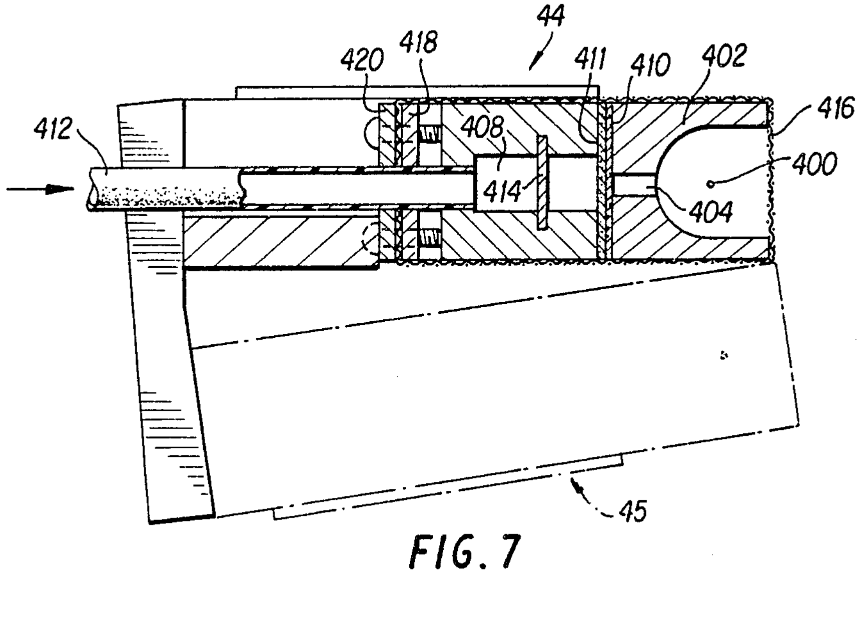
FIG. 7 is an enlarged sectional view of the corona neutralizer.

FIG. 6 is a perspective view of a corona neutralizer, with portions cut away to illustrate certain internal details. FIG. 7 is an enlarged sectional view of a corona neutralizer. The corona wire 400 is enclosed within an elongated conductive corona shield 402 which has a U-shaped cross-section and a series of holes 404 therethrough. The corona shield 402 is supported by a manifold block 406 which is formed with an oblong central cavity 408. A filter screen 410 is disposed between corona shield 402 and manifold block 406 over the entire length of the cavity 408. An air inlet tube 412 for supplying a flow of air to the corona neutralizer is connected with cavity 408. A solid diffuser disk 414 is nested within block 406 adjacent to filter screens 410, 411 opposite air inlet tube 412. An electrically grounded screen 416 is wrapped over the outside surfaces of the corona shield 402 and the manifold block 406. The two ends of screen 416 are secured between plates 418 and 420 in order to tighten the screen against the outside surfaces of the corona shield and manifold block. An identical corona neutralizer 45 is shown in phantom in FIG. 7 adjacent to corona neutralizer 44.

In operation, an AC potential is applied to the corona wire 400 so that both positive and negative ions are generated. Some of the negative ions are drawn through the screen 416 by the residual positive charges on the dielectric drum 34, and in this manner the drum surface is neutralized. The screen 416 is maintained at or near ground potential; as a result, the electric field existing between the screen and the drum surface will drop to zero when the drum surface has been completely neutralized, and the flow of negative ions toward the drum will cease. In general, the flow of ions between the corona wire 400 and the drum surface will cease when the potential of the drum surface becomes equal to the screen potential. When two corona neutralizers 44, 45 are used, as in the preferred embodiment, the screen potential of the first neutralizer may be made slightly negative in order to accelerate the rate of charge neutralization.

Figure 8:
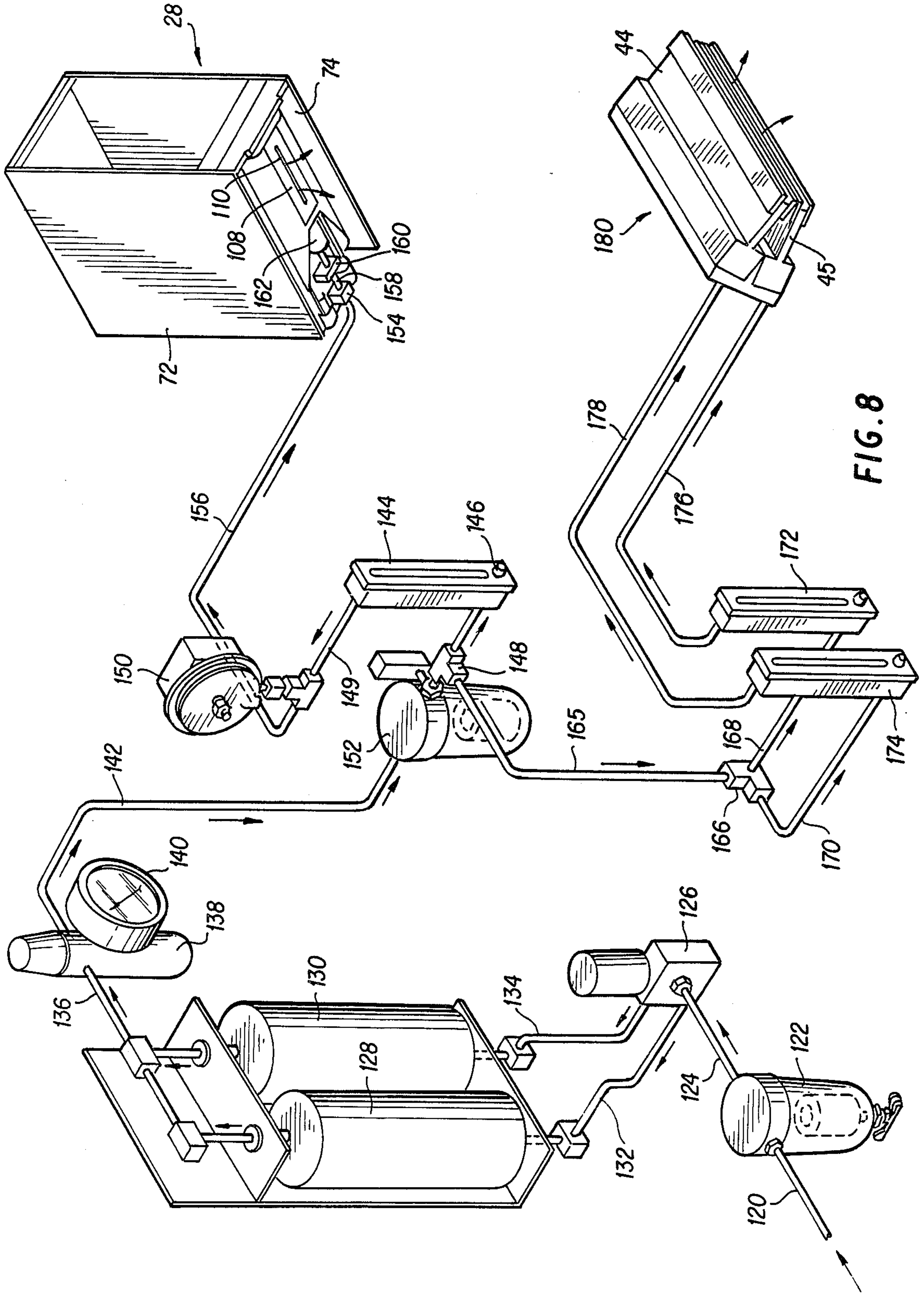
FIG. 8 illustrates the system which is used to supply dehumidified air to the electrostatic print head and to the corona neutralizer.

In accordance with the present invention, a flow of dehumidified air at or near ambient temperature is provided through the electrostatic print head 28 in order to inhibit the formation of ammonium nitrate in and around the apertures 96, 98 and on the corona wire 76, and through corona neutralizer unit 180 in order to inhibit the formation of ammonium nitrate on the corona wires and screen. An exemplary system for supplying dehumidified air to the print head 28 and corona neutralizer unit 180 is illustrated in FIG. 8. Compressed air at a minimum of 80 psi and generally about 80–100 psi enters the system through a section of tubing 120 and is conducted to the input side of a coalescing oil filter 122. The coalescing oil filter operates to remove any oil or water droplets which may be present in the source of compressed air. The output side of the filter 122 is connected by means of a further length of tubing 124 to a timer-operated solenoid valve 126. The solenoid valve is part of a commercially available air dryer system which also includes a pair of desiccant towers 128, 130. A suitable system of this type is the Model 311B air dryer manufactured by O'Keefe Controls Company of Monroe, Conn. The solenoid valve 126 operates on a 30-second cycle and directs the compressed air through the lengths of tubing 132, 134 and desiccant towers 128, 130 in an alternating manner. During each 30-second cycle, one of the desiccant towers is supplying dehumidified air to the output tubing 136 and the other desiccant tower is receiving a backflow of dehumidified air from the first tower in order to regenerate the desiccant material within the inoperative tower. Humid air from the tower being regenerated is discharged from the system through an exhaust muffler.

Dehumidified air from the output of the air dryer system passes through an output regulator 138 which controls the air pressure to the print head 28. A gage 140 allows the air pressure at the output of the regulator 138 to be monitored. From the output of the regulator 138, the dehumidified air passes via tubing 142 to the input side of a hydrocarbon filter 152. The output side of the hydrocarbon filter 152 is connected via a short length of tubing to a tee 148, one output of which is connected to the input side of an adjustable flow meter 144 of the floating ball type. In the preferred embodiment, the flow meter 144 is set to provide an air flow of about 41 cubic feet per hour to the electrostatic print head 28. A knob 146 on the flow meter allows the flow rate of the dehumidified air to be adjusted if necessary. The output side of the flow meter 144 is connected via a length of tubing 149 to a pressure sensor 150. The function of the pressure sensor 150 is to insure that adequate air pressure is being provided to the print head 28, and to interrupt the operation of the machine when this condition is not satisfied. The output side of the pressure sensor 150 is connected via a length of flexible tubing 156, which will not introduce any hydroargons, e.g. Bev-A-Line IV available from Cole Parmer, Chicago, or Teflon, to disconnect coupling 154 which is connected to a rigid tube 158 carried by the print head 28. The tube 158 passes through a support member 160 and is connected to the input side of a particulate filter 162. Referring to FIG. 3, the output side of the filter 162 is connected to an aperture 164 located at one end of the oblong central opening 82 in the frame 80. The aperture 164 delivers dehumidified air into the enclosed chamber formed by the openings 82, 86 and the cut-out 90 in the rear frame member 88. The dehumidified air flows around the sides of the corona shield 78 and passes through the gap between the corona shield and the aperture mask 94 to the interior of the corona shield, where it surrounds the corona wire 76 in the course of passing out of the print head through the apertures 96, 98 and the slotted mask 108.

The second output of the tee 148 is connected via tubing 165 to tee 166. One output of tee 166 is connected via tubing 168 to the input side of an adjustable flow meter 172 of the floating ball type. The other output of tee 166 is connected via tubing 170 to the input side of an identical adjustable flow meter 174. Flow meters 172, 174 are connected via tubing 176, 178 to corona neutralizer unit 180. Corona neutralizer unit 180 comprises two identical side-by-side corona neutralizers 44 and 45. Referring to FIG. 7, tubing 178 is connected to tubing 412 which delivers dehumidified air into the enclosed cavity 408. The dehumidified air flows around diffuser disk 414, through filter screens 410, 411 and through the series of holes 404 through corona shield 402, where it surrounds corona wire 400. The dehumidified air then passes through screen 416 against the dielectric coating of drum 34.

The flow of dehumidified air through the electrostatic print head 28 has been found to retard the buildup of ammonium nitrate on the corona wire 76, and in and around the electrically controlled apertures 96, 98, to a point where the useful life of the print head can be extended by an order of magnitude. This represents an enormous increase over the average lifetime of a print head not supplied with dehumidified air, which is typically about 75 hours. The flow of dehumidified air through the corona neutralizers, such as corona neutralizer 44, has been found to retard the buildup of ammonium nitrate on the corona wire 400 and screen 416. The use of dehumidified air has also been found to improve the retention of latent electrostatic images on the dielectric drum 34. The following examples, provided merely by way of illustration and not being intended as limitations on the scope of the invention, will assist in an understanding of the invention and the manner in which these advantageous results are obtained.

EXAMPLE 1

A test was conducted to determine the effect of dried air on the lifetime of electrostatic print heads. An apparatus was constructed which was capable of testing four print heads in parallel. Print performance was assessed quantitatively by measuring print quality as a function of time.

Figure 9:
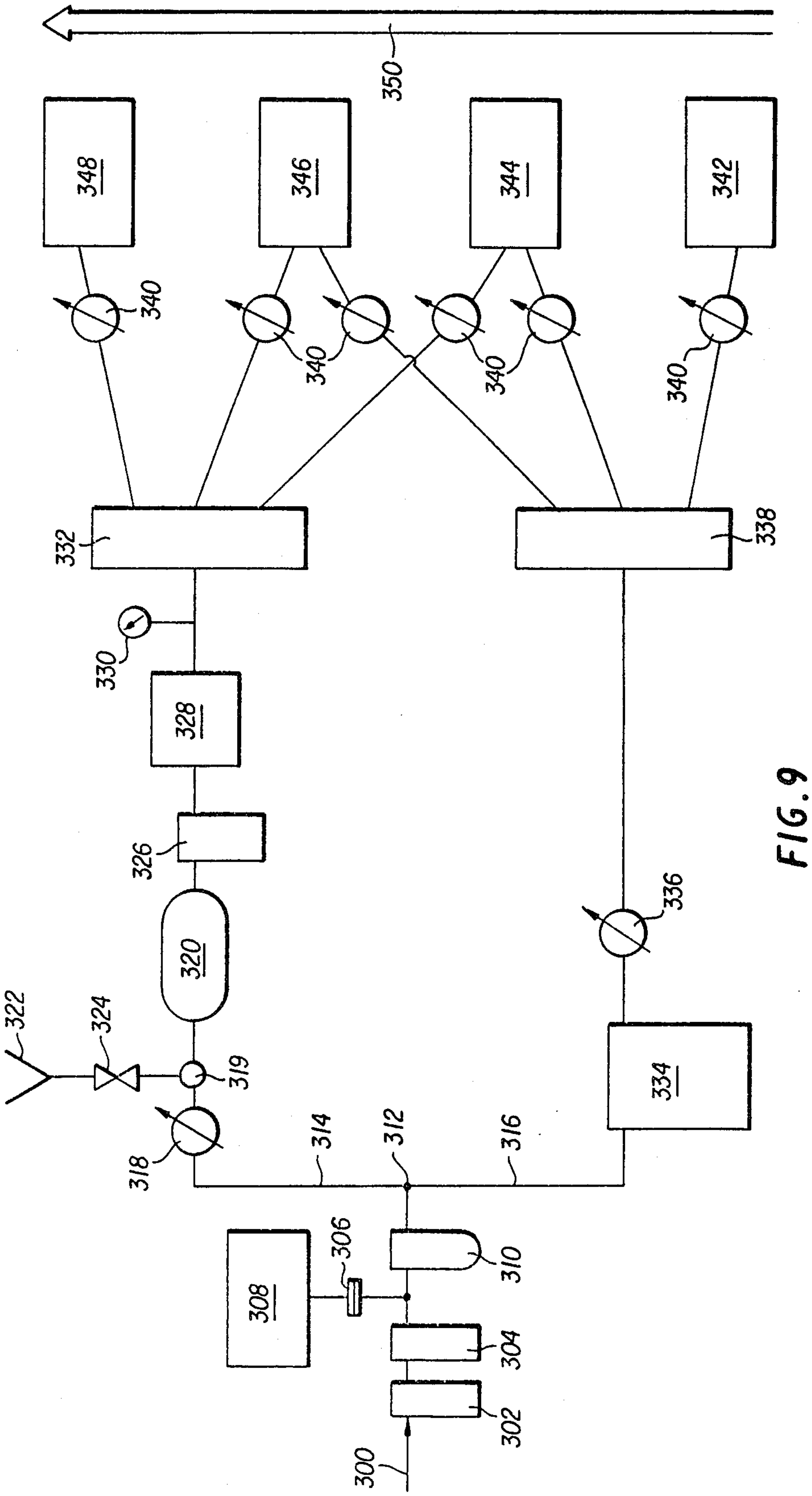
FIG. 9 is a schematic diagram of a test apparatus used to determine the effect of dehumidified air on the lifetime of electrostatic print heads.

A schematic diagram of the test apparatus used is shown in FIG. 9. Referring to FIG. 9, compressed air at about 100 psi entered the apparatus through tubing 300. All tubing used to connect the components of the apparatus was Bev-A-Line IV tubing. Tubing 300 was connected to coalescing oil filter 302 (Wilkerson F20-02-F00) and coalescing oil filter 304 (Wilkerson M20-02-F00) which were used to remove oil and water droplets present in the source of compressed air. A pressure switch 306 stopped power to the print heads from power source 308 in the event of air supply failure. The coalescing oil filters were connected to a charcoal filter 310 (Balston C1-150-19) which was used to remove oil or water droplets in the air. The charcoal filter was connected by a Tee joint 312 to the "wet" side of the apparatus 314 and to the "dry" side of the apparatus 316.

On the wet side 314, the Tee joint was connected first to a regulator 318 (0–60 psi) which permitted the air flow on the wet side to be balanced with that on the dry side. Regulator 318 was connected to humidifier 320, which consisted of a steel tank, about 12 inches in diameter and about 24 inches long and having rounded ends, through a three-way valve 319. Air entered and exited the tank coaxially at the ends. Water was added to the humidifier 320 by means of funnel 322 and valve 324, through three-way valve 319. Entering air became humidified by picking up water contained in the tank. The humidifier 320 was connected to a coalescing filter 326 (Balston Type BX) which was used to remove liquid water droplets from the humidifier and allow water vapor to pass through. Filter 326 was connected to a hygrometer in a pressurized box 328, which permitted quick measurement of the humidity in the humid air stream. Because it was pressurized, the humidity at atmospheric pressure was calculated from the pressure (P) and the relative humidity (RH) measured at pressure according to the following relationship:

$$\frac{P \text{ measurement}}{P \text{ atmospheric}} = \frac{\%\ RH \text{ measurement}}{\%\ RH \text{ atmospheric}}$$

Pressure gage 330 facilitated the above calculation. Hygrometer 328 was connected to wet air distribution manifold 332.

On the dry side 316, the Tee joint 312 was connected to air dryer 334 (O'Keefe Model OKC-079-2). Air dryer 334 was connected to a regulator 336 of the type used for regulator 318 on the wet side of the apparatus. Regulator 318 was connected to dry air distribution manifold 338. Wet air distribution manifold 332 and dry air distribution manifold 338 were connected through six identical flow meters 340 (Dwyer Rate Master Type RMA-8-SSV, 0-100 scfh flow). Flow meters 340 controlled the air flow to print head 342, print head 344, print head 346, and print head 348. All four print heads were of the type shown in FIGS. 3 and 4. The percent relative humidity (% RH) to print heads 344 and 346 was controlled by controlling the relative amounts of wet and dry air from manifolds 332 and 338, respectively. Arrow 350 points in the direction of increasing humidity of the air supplied to the print heads.

In order to assess the changes in print quality over a period of time due to the effect of the air humidity, prints were made periodically using the print heads and the decrease in image density was observed. Image density in an area is a function of charge density deposited by the print head in that area. Deposited charge density decreases as a function of aperture occlusion by the ammonium nitrate crystals which form as a result of the water in the air supplied to the print head. Therefore, measurement of image density uniformity will characterize the degree to which water in the air supply is degrading the print quality. Another indication of the buildup of ammonium nitrate crystals is the gradual increase in voltage needed to maintain a constant current from the corona wire to the mask and corona shield. This current is periodically measured.

Test prints were made periodically to permit measurement of image density. A portion of the test print was solid black which was printed by allowing all of the apertures to print. Such a test print allowed the assessment of the degree of occlusion of the apertures across the width of the print head by measurement of the relative image density across the print. Since print head to print head variations are possible, each test print was compared to a test print made with that particular print head at the start of the test.

The corona voltage of all four print heads was adjusted to give a total current of 200 μA to both mask and shield and was maintained at that value. Voltage readings at the start of the test are set forth in Table 1 below:

TABLE 1

| Print Head | Corona KV |
|---|---|
| 1 | 2.50 |
| 2 | 2.50 |
| 3 | 2.42 |
| 4 | 2.49 |

Several test prints were made from each print head and saved.

The test apparatus was placed in a room having a controlled temperature of 70° F. (21.1° C.). The compressed air in tubing 300 had a dew point of 20° F. (−6.6° C.). The humidity of air coming out of the humidifier 320 at equilibrium is a function of the temperature of the room and the flow rate which is held constant. The humidifier 320 was allowed to equilibrate to the room temperature and flow conditions used. The equilibrium point was about 55% RH at 6 psig and 72° F. (22.2° C.). This corresponded to 39% RH at atmospheric pressure for air from the humidifier. The four print heads were to be tested under the following conditions:

Print Head 342—very dry air from the air dryer; essentially 0% RH

Print Head 344—5% RH

Print Head 346—10% RH; This was selected to represent the absolute best conditions for year round operation without a dryer.

Print Head 348—very wet air; 100% humidified air of about 39% RH

In order to obtain these various humidities, the six flow meters 340 were set as follows:

Print Head 342—dry air (60 scfh)

Print Head 344—dry air (52 scfh) wet air (8 scfh)

Print Head 346—dry air (45 scfh) wet air (15 scfh)

Print Head 348—wet air (60 scfh)

Test prints were made periodically by removing the print heads from the test apparatus and inserting them in a Markem Model 7000 electrostatic printer. Attempts were made to maintain the same roll of dielectric paper and toner lot. All four print heads were turned on at 16:20 hours on day 1 of the test. The pressure reading on the hygrometer was increased to 15 psig.

At 07:25 hours on day 2, the test was stopped because the humidity of the air coming out of the humidifier had equilibrated overnight at 59% RH at 15 psig for an atmospheric relative humidity of about 30%. This was considered to be too low as the maximum relative humidity for the test. In order to increase the humidity of air from the humidifier, the flow rate through the humidifier was decreased in order to increase the residence time of the air in the humidifier. The flow through the humidifier was decreased by decreasing the flow through the masks. The flow meters to print heads 344 and 346 having a range of 0–100 scfh were not calibrated finely enough to accurately meter the humidified air to these print heads. A flow meter having a range of 0–5 scfh was used for print head 344 and a flow meter having a range of 0–10 scfh was used for print head 346.

At 15:41 hours on day 2, the print heads were restarted. Equilibrium was reached at 60% RH at 5 psig, which corresponds to about 45% at standard pressure. The flow rates were set as follows:

Print Head 342 (dry)—dry air (30 scfh)

Print Head 344 (5% RH)—dry air (27 scfh) wet air (3.3 scfh)

Print Head 346 (10% RH)—dry air (23 scfh) wet air (6.6 scfh)

Print Head 348 (45% RH)—wet air (30 scfh)

The data for the four print heads tested are set forth in Tables 2–5 below:

TABLE 2

Print Head 342

| Elapsed Hours | Corona KV | Comments |
|---|---|---|
| 0 | 2.50 | |
| 33.2 | 2.46 | |
| 63.4 | 2.49 | 60.0% RH @ 5.00 psig, 70° F. |
| 87.5 | 2.49 | 60.0% RH @ 5.00 psig, 74° F. |
| 109.7 | 2.50 | 60.0% RH @ 5.00 psig, 75° F. |
| 128.2 | 2.51 | 60.0% RH @ 5.00 psig, 71° F. |
| 153.4 | 2.50 | 59.0% RH @ 5.00 psig, 72° F. |
| 194.2 | 2.51 | 56.5% RH @ 5.00 psig, 74° F. |
| 214.4 | 2.52 | 57.0% RH @ 4.00 psig, 74° F. |

TABLE 2-continued

| Print Head 342 | | |
|---|---|---|
| Elapsed Hours | Corona KV | Comments |
| 254.1 | 2.50 | 60.0% RH @ 4.00 psig, 72° F. |
| 281.9 | 2.50 | 56.5% RH @ 4.00 psig, 71° F. |
| 346.2 | 2.49 | 52.0% RH @ 4.00 psig, 75° F. |
| 384.2 | 2.50 | 58.0% RH @ 4.00 psig, 71° F. |
| 406.0 | 2.50 | 62.0% RH @ 5.00 psig, 74° F. |
| 434.8 | 2.51 | 59.0% RH @ 5.00 psig, 73° F. |
| 463.1 | 2.50 | 54.0% RH @ 5.00 psig, 75° F. |
| 486.4 | 2.50 | 55.0% RH @ 5.00 psig, 73° F. |
| 500.8 | 2.51 | 56.0% RH @ 5.00 psig, 73° F. |
| 508.3 | 2.50 | 53.0% RH @ 4.75 psig, 74° F. |
| 532.8 | 2.49 | 53.0% RH @ 4.50 psig, 73° F. |
| 556.0 | 2.47 | 52.0% RH @ 4.50 psig, 73° F. |
| 578.6 | 2.49 | 54.0% RH @ 5.00 psig, 73° F. |
| 594.8 | 2.49 | 56.0% RH @ 5.00 psig, 73° F. |
| 649.9 | 2.50 | 51.0% RH @ 4.75 psig, 74° F. |
| 688.8 | 2.53 | 52.0% RH @ 5.00 psig, 73° F. |
| 695.3 | 2.52 | 52.0% RH @ 5.00 psig, 73° F. |
| 716.5 | 2.50 | 50.0% RH @ 5.00 psig, 76° F. |
| 772.9 | 2.50 | 49.0% RH @ 4.75 psig, 75° F. |

TABLE 3

| Print Head 344 | | |
|---|---|---|
| Elapsed Hours | Corona KV | Comments |
| 0 | 2.50 | |
| 33.1 | 2.49 | |
| 63.0 | 2.52 | 60.0% RH @ 5.00 psig, 70° F. |
| 87.3 | 2.53 | 60.0% RH @ 5.00 psig, 74° F. |
| 109.5 | 2.54 | 60.0% RH @ 5.00 psig, 75° F. |
| 127.8 | 2.56 | 60.0% RH @ 5.00 psig, 71° F. |
| 152.8 | 2.54 | 59.0% RH @ 5.00 psig, 72° F. |
| 193.3 | 2.55 | 56.5% RH @ 5.00 psig, 74° F. |
| 213.4 | 2.55 | 57.0% RH @ 4.00 psig, 74° F. |
| 252.9 | 2.54 | 60.0% RH @ 4.00 psig, 72° F. |
| 280.4 | 2.53 | 56.5% RH @ 4.00 psig, 71° F. |
| 344.1 | 2.53 | 52.0% RH @ 4.00 psig, 75° F. |
| 381.7 | 2.53 | 58.0% RH @ 4.00 psig, 71° F. |
| 403.3 | 2.53 | 62.0% RH @ 5.00 psig, 74° F. |
| 431.9 | 2.53 | 59.0% RH @ 5.00 psig, 73° F. |
| 459.9 | 2.53 | 54.0% RH @ 5.00 psig, 75° F. |
| 483.1 | 2.54 | 55.0% RH @ 5.00 psig, 73° F. |
| 497.4 | 2.55 | 56.0% RH @ 5.00 psig, 73° F. |
| 504.9 | 2.53 | 53.0% RH @ 4.75 psig, 74° F. |
| 529.2 | 2.53 | 53.0% RH @ 4.50 psig, 73° F. |
| 552.2 | 2.51 | 52.0% RH @ 4.50 psig, 73° F. |
| 574.7 | 2.53 | 54.0% RH @ 5.00 psig, 73° F. |
| 590.7 | 2.53 | 56.0% RH @ 5.00 psig, 73° F. |
| 645.4 | 2.55 | 51.0% RH @ 4.75 psig, 74° F. |
| 684.1 | 2.55 | 52.0% RH @ 5.00 psig, 73° F. |
| 690.6 | 2.55 | 52.0% RH @ 5.00 psig, 73° F. |
| 711.6 | 2.55 | 50.0% RH @ 5.00 psig, 76° F. |
| 767.5 | 2.53 | 49.0% RH @ 4.75 psig, 75° F. |

TABLE 4

| Print Head 346 | | |
|---|---|---|
| Elapsed Hours | Corona KV | Comments |
| 0 | 2.42 | |
| 32.9 | 2.48 | |
| 62.8 | 2.50 | 60.0% RH @ 5.00 psig, 70° F. |
| 87.3 | 2.51 | 60.0% RH @ 5.00 psig, 74° F. |
| 109.4 | 2.52 | 60.0% RH @ 5.00 psig, 75° F. |
| 127.7 | 2.54 | 60.0% RH @ 5.00 psig, 71° F. |
| 152.6 | 2.52 | 59.0% RH @ 5.00 psig, 72° F. |
| 192.8 | 2.53 | 56.5% RH @ 5.00 psig, 74° F. |
| 212.9 | 2.54 | 57.0% RH @ 4.00 psig, 74° F. |
| 252.2 | 2.52 | 60.0% RH @ 4.00 psig, 72° F. |
| 279.7 | 2.51 | 56.5% RH @ 4.00 psig, 71° F. |
| 343.3 | 2.52 | 52.0% RH @ 4.00 psig, 75° F. |
| 380.8 | 2.51 | 58.0% RH @ 4.00 psig, 71° F. |
| 402.5 | 2.52 | 62.0% RH @ 5.00 psig, 74° F. |

TABLE 4-continued

| Print Head 346 | | |
|---|---|---|
| Elapsed Hours | Corona KV | Comments |
| 431.0 | 2.55 | 59.0% RH @ 5.00 psig, 73° F. |
| 458.9 | 2.52 | 54.0% RH @ 5.00 psig, 75° F. |
| 482.0 | 2.54 | 55.0% RH @ 5.00 psig, 73° F. |
| 496.3 | 2.54 | 56.0% RH @ 5.00 psig, 73° F. |
| 503.7 | 2.52 | 53.0% RH @ 4.75 psig, 74° F. |
| 527.9 | 2.52 | 53.0% RH @ 4.50 psig, 73° F. |
| 550.8 | 2.51 | 52.0% RH @ 4.50 psig, 73° F. |
| 573.2 | 2.50 | 54.0% RH @ 5.00 psig, 73° F. |
| 589.3 | 2.50 | 56.0% RH @ 5.00 psig, 73° F. |
| 643.7 | 2.51 | 51.0% RH @ 4.75 psig, 74° F. |
| 682.3 | 2.51 | 52.0% RH @ 5.00 psig, 73° F. |
| 688.8 | 2.51 | 52.0% RH @ 5.00 psig, 73° F. |
| 710.0 | 2.51 | 50.0% RH @ 5.00 psig, 76° F. |
| 765.2 | 2.49 | 49.0% RH @ 4.75 psig, 75° F. |

TABLE 5

| Print Head 348 | | |
|---|---|---|
| Elapsed Hours | Corona KV | Comments |
| 0 | 2.49 | |
| 33.0 | 2.57 | |
| 63.0 | 2.66 | 60.0% RH @ 5.00 psig, 70° F. |
| 87.4 | 2.69 | 60.0% RH @ 5.00 psig, 74° F. |
| 109.5 | 2.69 | 60.0% RH @ 5.00 psig, 75° F. |
| 127.8 | 2.69 | 60.0% RH @ 5.00 psig, 71° F. |
| 152.7 | 2.68 | 59.0% RH @ 5.00 psig, 72° F. |
| 193.0 | 2.70 | 56.5% RH @ 5.00 psig, 74° F. |
| 213.1 | 2.70 | 57.0% RH @ 4.00 psig, 74° F. |
| 253.4 | 2.68 | 60.0% RH @ 4.00 psig, 72° F. |
| 279.9 | 2.66 | 56.5% RH @ 4.00 psig, 71° F. |
| 343.4 | 2.69 | 52.0% RH @ 4.00 psig, 75° F. |
| 380.9 | 2.68 | 58.0% RH @ 4.00 psig, 71° F. |
| 402.6 | 2.68 | 62.0% RH @ 5.00 psig, 74° F. |
| 431.1 | 2.70 | 59.0% RH @ 5.00 psig, 73° F. |
| 459.1 | 2.68 | 54.0% RH @ 5.00 psig, 75° F. |
| 482.2 | 2.70 | 55.0% RH @ 5.00 psig, 73° F. |
| 496.5 | 2.70 | 56.0% RH @ 5.00 psig, 73° F. |
| 504.0 | 2.68 | 53.0% RH @ 4.75 psig, 74° F. |
| 528.2 | 2.71 | 53.0% RH @ 4.50 psig, 73° F. |
| 551.1 | 2.69 | 52.0% RH @ 4.50 psig, 73° F. |
| 573.5 | 2.71 | 54.0% RH @ 5.00 psig, 73° F. |
| 589.6 | 2.70 | 56.0% RH @ 5.00 psig, 73° F. |
| 644.1 | 2.72 | 51.0% RH @ 4.75 psig, 74° F. |
| 682.6 | 2.72 | 52.0% RH @ 5.00 psig, 73° F. |
| 689.1 | 2.73 | 52.0% RH @ 5.00 psig, 73° F. |
| 710.0 | 2.73 | 50.0% RH @ 5.00 psig, 76° F. |
| 765.8 | 2.70 | 49.0% RH @ 4.75 psig, 75° F. |

Although most of the print quality from print head 344 was uniform, a band of apertures about 2 cm wide did not print. The print head was removed from the test apparatus and examined. Ammonium nitrate had built up on both the inside and the outside of the apertures in that band. The remainder of the mask was clear of obstructions and printed well.

In order to quantitatively measure the print quality, the optical densities of the printed images from the four print heads were measured. The instrument used for this purpose was a Welch Densichron Model 1 photometer with a Model 3832A reflection unit measuring head. This instrument illuminated the printed image with a light and measured the reflected light from a spot approximately ⅛ inch in diameter.

The instrument was allowed to warm up and was adjusted to read 100% reflected on a standard white glass tile and 0% transmitted on a standard black glass tile. The clear filter was used. Readings were taken of the printed images and the variations of the reflectance across the image.

TABLE 6

| Elapsed Hours | Print Head 342 | | | Print Head 344 | | | Print Head 346 | | | Print Head 348 | | |
|---|---|---|---|---|---|---|---|---|---|---|---|---|
| 0 | 17 | 0.41 | 41 | 4 | 0.29 | 14 | 3 | 0.20 | 15 | 5 | 0.20 | 25 |
| | 0.77 | 1.97 | 0.39 | 1.40 | 1.65 | 0.85 | 1.52 | 1.85 | 0.82 | 1.30 | 2.17 | 0.60 |
| 63 | 12 | 0.35 | 34 | 7 | 0.50 | 14 | 6 | 0.32 | 19 | 4 | 0.09 | 44 |
| | 0.92 | 1.96 | 0.47 | 1.15 | 1.35 | 0.85 | 1.22 | 1.69 | 0.72 | 1.40 | 3.89 | 0.36 |
| 194 | 25 | 0.63 | 40 | 4 | 0.05 | 81 | 12 | 0.41 | 29 | 10 | 0.19 | 53 |
| | 0.60 | 1.50 | 0.40 | 1.40 | 15.6 | 0.9 | 0.92 | 1.70 | 0.54 | 1.0 | 3.57 | 0.28 |
| 406 | 17 | 0.41 | 41 | 7 | 0.07 | 100 | 12 | 0.5 | 24 | 13 | 0.28 | 47 |
| | 0.77 | 1.97 | 0.39 | 1.15 | 0.0 | 0.0 | 0.92 | 1.48 | 0.62 | .89 | 2.70 | 0.33 |
| 595 | 17 | 0.40 | 42 | 7 | 0.07 | 100 | 11 | 0.26 | 42 | 18 | 0.19 | 93 |
| | 0.77 | 2.03 | 0.38 | 1.15 | 0.0 | 0.0 | 0.96 | 2.53 | 0.38 | 0.74 | 24.67 | 0.03 |
| 773 | 19 | 0.40 | 47 | 5 | 0.05 | 100 | 10 | 0.25 | 40 | 11 | 0.11 | 98 |
| | 0.72 | 2.18 | 0.33 | 1.30 | 0.0 | 0.0 | 1.0 | 2.50 | 0.40 | 0.96 | 96 | 0.01 |

The optical density data is set forth in Table 6 above in the following format:

$$\% \text{ Reflectance (min)} \ \frac{\% \text{ R (min)}}{\% \text{ R (max)}} \ \% \text{ Reflectance (max)}$$

$$\text{Optical Density (min)} \ \frac{\text{O.D. (min)}}{\text{O.D. (max)}} \ \text{Optical Density (max)}$$

The four print heads were run for about 773 hours under the four different humidity conditions. The data was reviewed in an effort to determine the level of dehumidification required to achieve a print head life of 300 hours with good print quality. The values for percent relative humidity were initially selected based on the belief that they would bracket the 300-hour mark. Periodic print tests as well as measurements of the corona voltage, shield current and mask current were made. The following results for the four print heads were obtained:

Print Head 342—(very dry air) The print tests showed that this print head had substantially unchanged print quality throughout the 773-hour test.

Print Head 344—(nominal 5% RH) This print head showed an anomolous are of light print which was probably due to print head geometry with a self-reinforcing cycle of ammonium nitrate formation, which began to manifest itself about 150 hours into the test. The remainder of the printed image appeared very uniform with no substantial degradation of print quality after 773 hours.

Print Head 346—(nominal 10% RH) This print head showed reasonable print quality beyond 300 hours, although at over 700 hours the print quality and uniformity were not as good as the prints of print head 342 or of the unaffected portion of print head 344.

Print Head 348—(nominal 40% RH) The performance of this print head was unacceptable. The print quality was very non-uniform even after only 63 hours of operation.

Figure 10:
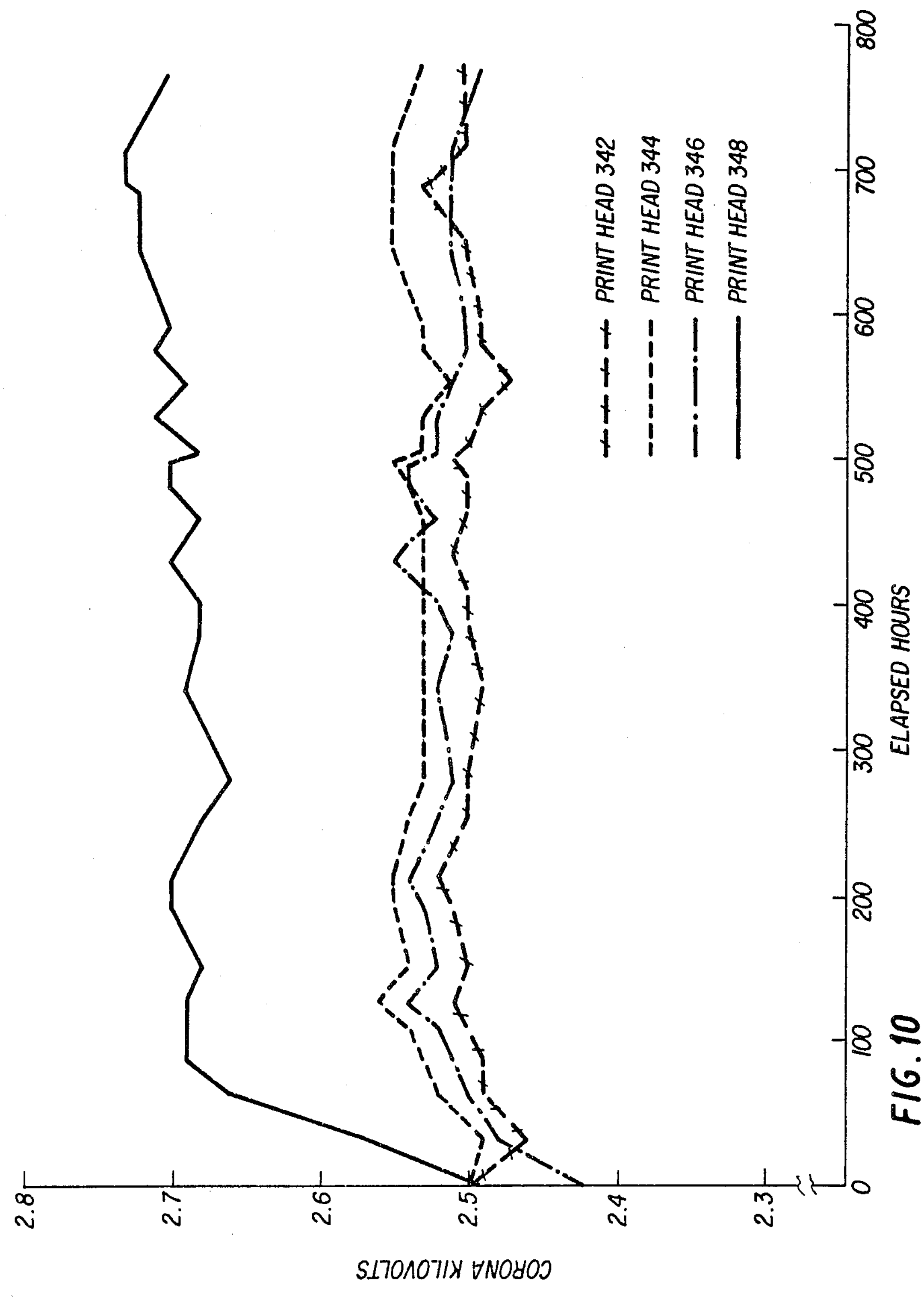
FIG. 10 is a plot of corona kilovolts versus elapsed hours based on the data presented in Example 1 below.

The change in corona voltage over time was found to be a good indication of the buildup of ammonium nitrate, and therefore, of the print quality from the mask. This is due to the fact that the high voltage supply to the corona wire operates in a current regulated mode. As contaminants build up on the corona wire, the voltage required to maintain a constant current increases. The data for corona voltage are set forth in Tables 2–5 above. A plot of corona kilovolts versus elapsed hours appears in FIG. 10. The corona voltages for print heads 342, 344 and 346 were approximately the same, while the corona voltage for print head 348 quickly rose to the limit imposed by the current limited power supply. The corona voltage would have gone higher without this limit.

The optical test which was conducted in an effort to quantify the print quality as a function of time indicated that the images printed by print heads 342 and 344 (with the exception of the anomolous region) and 346 were very similar. One reasonable measure of print uniformity is the ratio of the reflectance of the least reflective area on the print to the reflectance of the most reflective area. If the print were perfectly uniform, this ratio would be equal to 1, since there would be no difference between the most and the least reflective areas. At the conclusion of the test, the values of this ratio for the four print heads were as follows:

Print Head 342—0.43
Print Head 344—0.17
Print Head 346—0.32
Print Head 348—0.18

If print head 344 had not performed so anomolously, its ratio would probably be between those of print heads 342 and 346, so that the drier the air flowing through the print head, the more uniform the prints produced by that print head.

This test demonstrated that satisfactory print quality and uniformity can be obtained at 300 hours by passing air at 10% RH or less through the print head and that drier air can extend the lifetime of the print head for beyond this point, whereas air at 40% RH leads to substantial non-uniformity of the print at only 63 hours.

EXAMPLE 2

A second test was conducted to expand the range of relative humidities of the air flowing through the print heads. One of the four print heads in this test was run with very dry air and the others were run with air having relative humidities of 10%, 20% and 30%. The test apparatus of FIG. 9 was changed slightly to accommodate the different range of flow rates by installing more accurate flow meters. In this test, the air flow to the various print heads was adjusted each time the humidity and the pressure of the humidified air source was checked. This permitted more accurate long term testing regardless of the drift in the humidity of the air going through the system.

The print heads used in Example 1 were cleaned and the aperture mask in print head 344 was replaced. New corona wires were installed. Each print head was adjusted to have a combined mask and shield current of 200 μA. The four print heads were tested under the following conditions:

Print Head 342—essentially 0% RH dry air; (30 scfh)
Print Head 344—nominal 10% RH; dry air (24 scfh) wet air (6 scfh)

Print Head 346—nominal 20% RH; dry air (19 scfh) wet air (11 scfh)

Print Head 348—nominal 30% RH; dry air (13 scfh) wet air (17 scfh)

Test prints were made periodically as described in Example 1 above.

The data for the four print heads tested are set forth in Tables 7-10 below:

TABLE 7

| Print Head 342 | | |
|---|---|---|
| Elapsed Hours | Corona KV | % RH @ Atmos. P |
| 0 | 2.51 | 53 |
| 29.0 | 2.50 | 54 |
| 53.7 | 2.50 | 52 |
| 81.3 | 2.47 | 49 |
| 105.5 | 2.47 | 48.7 |
| 163.9 | 2.48 | 52.2 |
| 191.5 | 2.49 | 49.9 |
| 230.3 | 2.48 | 46.8 |
| 295.8 | 2.49 | 43.6 |
| 319.7 | 2.51 | 48.6 |
| 360.1 | 2.50 | 51.5 |
| 407.0 | 2.50 | 50.7 |

TABLE 8

| Print Head 344 | | |
|---|---|---|
| Elapsed Hours | Corona KV | % RH @ Atmos. P |
| 0 | 2.49 | 53 |
| 28.9 | 2.50 | 54 |
| 53.5 | 2.51 | 52 |
| 81.0 | 2.49 | 49 |
| 104.9 | 2.49 | 48.7 |
| 163.0 | 2.49 | 52.2 |
| 190.4 | 2.49 | 49.9 |
| 229.1 | 2.49 | 46.8 |
| 294.1 | 2.51 | 43.6 |
| 317.8 | 2.52 | 48.6 |
| 358.0 | 2.51 | 51.5 |
| 404.5 | 2.50 | 50.7 |

TABLE 9

| Print Head 346 | | |
|---|---|---|
| Elapsed Hours | Corona KV | % RH @ Atmos. P |
| 0 | 2.50 | 53 |
| 28.6 | 2.52 | 54 |
| 53.0 | 2.54 | 52 |
| 80.3 | 2.52 | 49 |
| 104.1 | 2.52 | 48.7 |
| 162.0 | 2.53 | 52.2 |
| 189.1 | 2.53 | 49.9 |
| 227.4 | 2.53 | 46.8 |
| 292.2 | 2.55 | 43.6 |
| 315.7 | 2.56 | 48.6 |
| 355.6 | 2.55 | 51.5 |
| 401.9 | 2.55 | 50.7 |

TABLE 10

| Print Head 348 | | |
|---|---|---|
| Elapsed Hours | Corona KV | % RH @ Atmos. P |
| 0 | 2.52 | 53 |
| 28.7 | 2.56 | 54 |
| 53.2 | 2.58 | 52 |
| 80.7 | 2.56 | 49 |
| 104.6 | 2.57 | 48.7 |
| 162.5 | 2.59 | 52.2 |
| 189.7 | 2.61 | 49.9 |
| 228.4 | 2.61 | 46.8 |
| 293.4 | 2.64 | 43.6 |

TABLE 10-continued

| Print Head 348 | | |
|---|---|---|
| Elapsed Hours | Corona KV | % RH @ Atmos. P |
| 317.0 | 2.66 | 48.6 |
| 357.0 | 2.66 | 51.5 |
| 403.5 | 2.67 | 50.7 |

Figure 11:
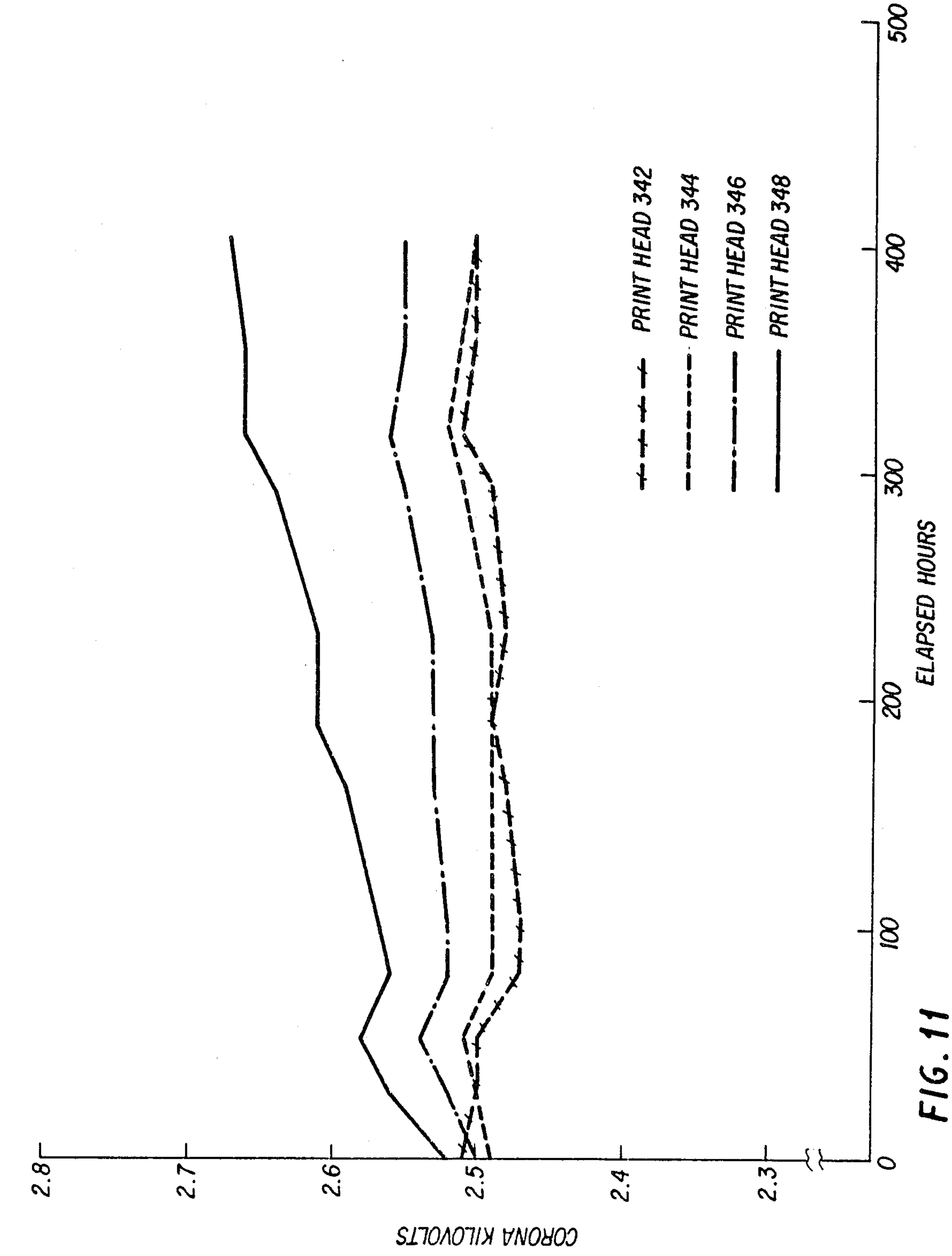
FIG. 11 is a plot of corona kilovolts versus elapsed hours based on the data presented in Example 2 below.

The results of the print tests and a comparison of the corona voltages for the four print heads over time indicates a clear difference in print head performance at different percent relative humidities of the air flowing through the print heads. The measurement of corona voltage versus time is especially significant. Corona voltage has historically been a measure of cleanliness of the print head, since the corona voltage needed to maintain the same current increases as contaminants buildup. A plot of corona kilovolts versus elapsed hours based on the data set forth in Tables 7-10 above appears in FIG. 11.

As in Example 1 above, print head 344 showed some anomolous results, even though the aperture mask was replaced. This is probably due to a geometric feature of this particular print head. It was observed that one side of the printed image became lighter due to the buildup of ammonium nitrate in part of the mask.

Disregarding the anomolous results from print head 344, print head 348 (30% RH) was the first one to show a lightening of the print on the edge of the image. This lightening was readily apparent at 106 hours. Print head 346 (20% RH) began to show a lightening at the edge of the printed image at 164 hours, which became very evident by 296 hours. By contrast, in the case of print head 342 (very dry air—dew point $<-50°$ F.), there was no perceptible difference in appearance of the printed image even after 407 hours of operation. Therefore, the lifetime of a print head is a function of the degree of dehumidification of the air passing through the print head.

For the purpose of printing with an electrostatic print head of the type used in Examples, a lifetime of less than about 300 hours has been deemed to be unacceptable. This lifetime was selected as desirable even though the use of this type of print head without any dehumidification of the air, at a relative humidity of 50-60 percent, will generally only maintain print quality and uniformity for about 60 hours. As shown by these tests, acceptable print quality for about 300 hours of operation can be obtained if the air flowing through the print head has a relative humidity of less than about 20 percent, and preferably less than 5 percent. There appears to be no lower limit for the humidity of the air that will result in acceptable print quality within the limits of economically reasonable drying equipment.

If a print head were to be designed which was less expensive to manufacture or service than those employed in the Examples, a relative humidity higher than 20 percent may be found to be acceptable. Although the lifetime of the print head would be shorter at higher percent relative humidity, the print head could be economically replaced at the end of its shorter lifetime.

EXAMPLE 3

A test was conducted to determine the effect of dried air on the lifetime of the A.C. corona scorotrons (neutralizers) used to discharge the residual charge on the dielectric drum.

A grounded conductive aluminum drum was placed adjacent to and above a double unit scorotron similar to that shown in FIGS. 6 and 8 to simulate an offset electrostatic printer of the type shown in FIG. 1. A separate supply of air was connected to each side of the scorotron unit. Compressed ambient air was pumped through tubing in the "wet" side of the scorotron unit. This air was also pumped through an air dryer (O'Keefe Model 311B) and then into the "dry" side of the scorotron unit. Air was pumped into each side of the scorotron unit at a rate of about 30 cfh. 60 Hz A.C. was applied to the corona units. The power supply was a 8000 V rms A.C. The scorotron units were run for about 755 hours and then examined. A significant difference was noted between the "dry" air side and the "wet" air side of the unit. The screen on the wet air side had many spots covered with rust and ammonium nitrate crystals. An extensive amount of ammonium nitrate crystals were present at the ends of the wet air side. The screen on the dry air side had less ammonium nitrate crystals and less rust.

There were patterns on the aluminum drum which corresponded to the rusted areas on the screen. Ammonium nitrate was also deposited on the drum with more present on the wet air side than on the dry air side.

EXAMPLE 4

The A.C. corona scorotron lifetime test of Example 3 above was repeated with a number of important differences. The 303 stainless steel screen (200 mesh) used in the scorotron unit in Example 3 was replaced with a 316 stainless steel screen (200 mesh) which was more corrosion resistant. The scorotron holder was redesigned so that air was distributed through a series of 11 small holes in the back. An anodized aluminum drum was coated with aluminum foil. The foil was grounded so that a record could be preserved with the pattern of ammonium nitrate deposition.

Compressed air was pumped into the "wet" air side of the scorotron unit and through the air dryer into the "dry" air side of the unit as described in Example 3. The flow rate of the air into each side was about 30 cfh.

The scorotron units were run for about 740 hours and then examined. The screen on the wet air side of the scorotron unit had 11 spots of ammonium nitrate crystals deposited on it corresponding to the location of the air inlet holes. The wet air side screen also exhibited a yellowish discoloration between the spots. There was no pattern of spots corresponding to the air entry holes on the screen on the dry air side of the scorotron unit. The yellowish discoloration was somewhat present on the dry air side screen, but much less prominent than on the wet air side. On the inside surfaces of the two screens, the difference was much more pronounced.

Inside the corona units, a large amount of ammonium nitrate crystals formed at the nodes on the corona wire on the wet air side and a small amount of buildup was present on the dry air side.

A large amount of ammonium nitrate crystals were deposited on the aluminum foil covering the drum on the wet air side and a small amount were deposited on the dry air side.

What is claimed is:

1. An offset electrostatic printer comprising:

(a) an ion modulated electrostatic print head for forming latent electrostatic images, (b) a dielectric imaging member comprising a layer of dielectric material, (c) means for developing a latent electrostatic image on the dielectric imaging member, (d) means for transferring a developed electrostatic image from the dielectric imaging member to an image receiving surface, (e) means for supplying unheated dehumidified air having a relative humidity of less than about 20 percent at or near ambient temperatures, and (f) means for directing the dehumidified air at, near or through the print head and at or near the dielectric imaging member.

2. The offset electrostatic printer of claim 1 wherein supply means (e) is capable of supplying unheated dehumidified air having a relative humidity of less than about 5 percent at or near ambient temperature.

3. The offset electrostatic printer of claim 1 wherein the dielectric imaging member comprises a layer of dielectric material on a conductive substrate.

4. The offset electrostatic printer of claim 1 wherein the print head comprises means for defining a plurality of selectively modulated beams of ions and an ion generator for providing ions, and wherein the dehumidified air flows at or near the beams of ions and at or near the ion generator.

5. The offset electrostatic printer of claim 4 wherein the ion generator comprises a corona wire using a DC voltage source.

6. The offset electrostatic printer of claim 4 wherein the ion generator comprises a dielectric-coated conductor using an AC voltage source.

7. The offset electrostatic printer of claim 1 wherein the print head comprises a modulated aperture board having a plurality of selectively controlled apertures therein, and an ion generator for providing ions for electrostatic projection through the apertures, and wherein the dehumidified air can flow at or near the ion generator and at, near or through of the apertures.

8. The offset electrostatic printer of claim 7 wherein the apertures function to selectively block or permit the flow of ions, and wherein the ion generator comprises a corona wire.

9. The offset electrostatic printer of claim 1 further comprising:

(g) an ion generator for erasing latent electrostatic images, and (h) means for directing the dehumidified air at or near the ion generator (g).

10. An offset electrostatic imaging process which comprises the steps of:

(a) forming a latent electrostatic image on a dielectric imaging member using an ion modulated electrostatic print head, (b) developing the latent electrostatic image, (c) transferring the developed electrostatic image from the dielectric imaging member to an image receiving surface, (d) providing unheated dehumidified air having a relative humidity of less than about 20 percent at or near ambient temperature, and (e) directing the dehumidified air at, near or through the print head and at or near the dielectric imaging member.

11. The offset electrostatic imaging process of claim 10 wherein the dehumidified air has a relative humidity of less than about 5 percent at or near ambient temperature.

12. The offset electrostatic printing process of claim 10 wherein the print head comprises a modulated aperture board having a plurality of selectively controlled apertures therein, and an ion generator for providing ions for electrostatic projection through the apertures, and wherein the dehumidified air is directed at or near the ion generator and at, near or through the apertures.

13. The offset electrostatic imaging process of claim 12 wherein the apertures function to selectively block or permit the flow of ions, and wherein the ion generator comprises a corona wire.

14. The offset electrostatic imaging process of claim 10 further comprising the step of:

(f) erasing the latent electrostatic image by means of an ion generator, and (g) directing the dehumidified air at or near the ion generator in step (f).

* * * * *